Feb. 14, 1961
C. W. KEUFFEL ET AL
2,971,427
SELF-CORRECTING ALIDADE
Filed Jan. 17, 1955
3 Sheets-Sheet 1
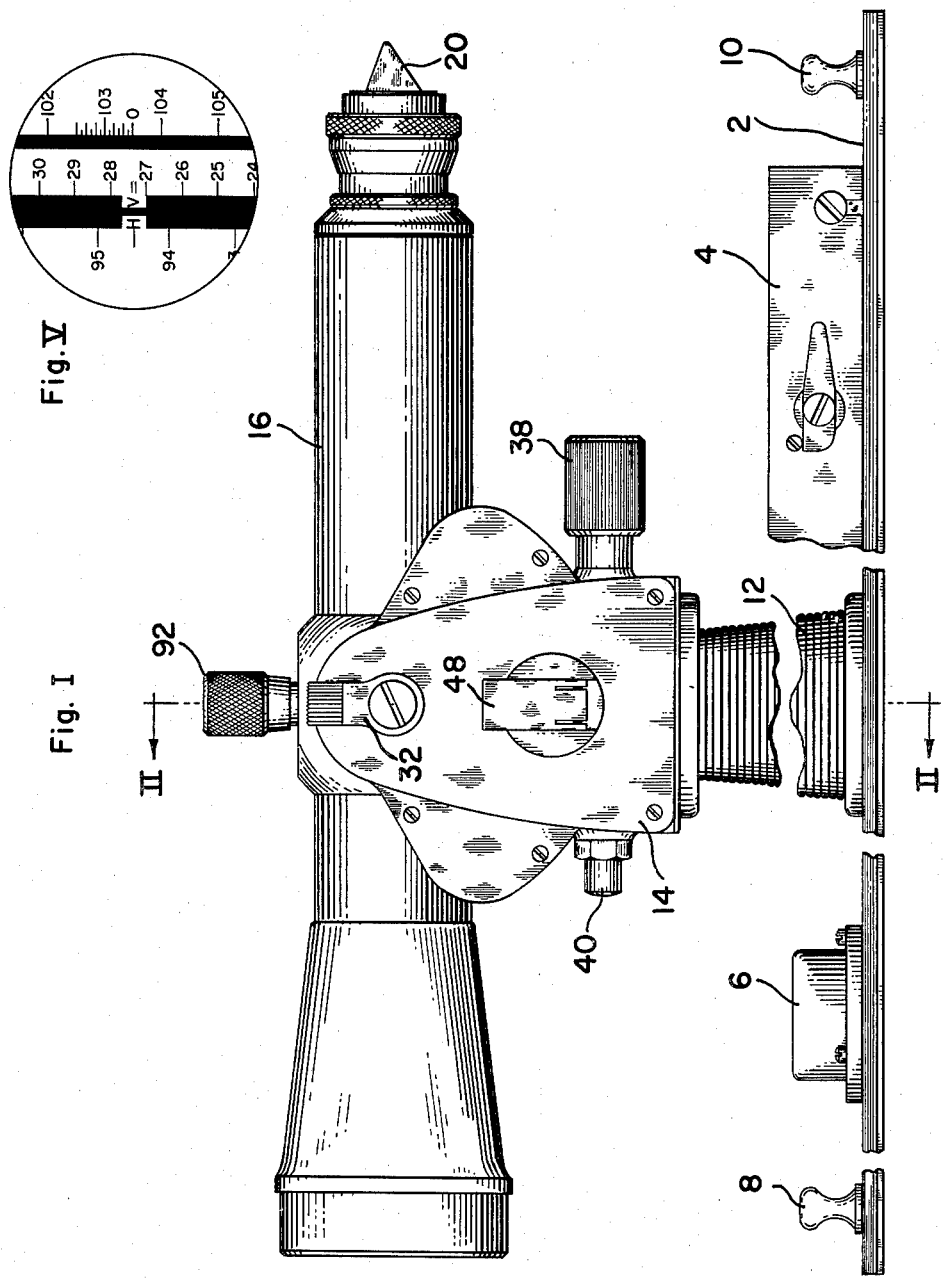
INVENTORS
CARL W. KEUFFEL
ALLISTER L. BAKER
CONWAY D. HILLMAN
BY
ATTORNEY Feb. 14, 1961
C. W. KEUFFEL ET AL
2,971,427
SELF-CORRECTING ALIDADE
Filed Jan. 17, 1955
3 Sheets-Sheet 2
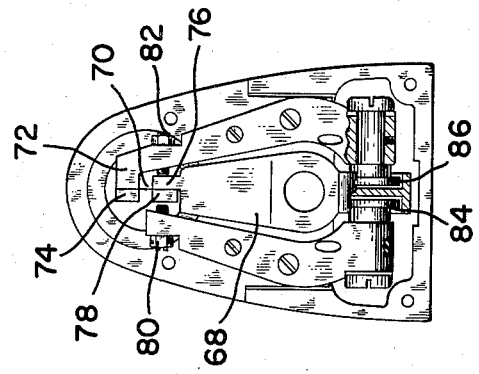
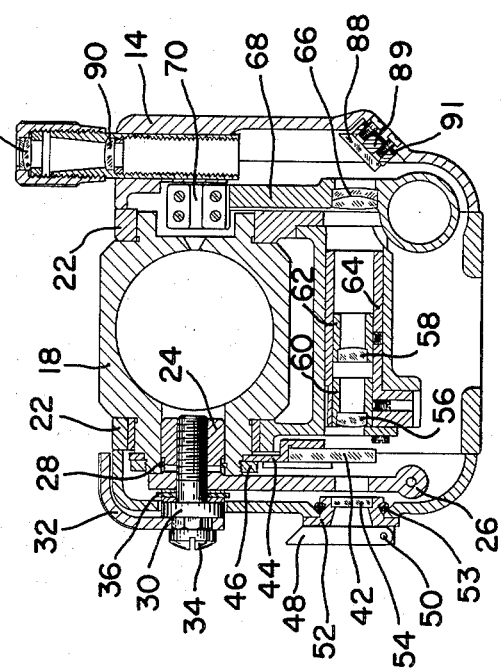
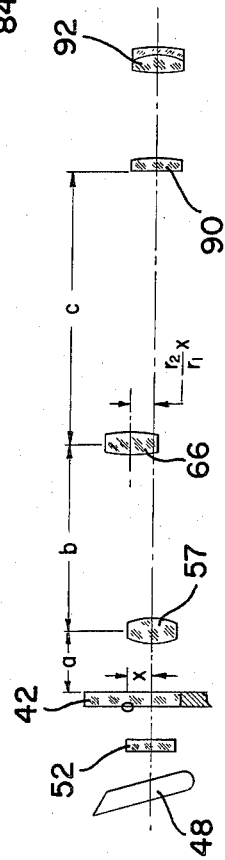
INVENTORS
CARL W. KEUFFEL
ALLISTER L. BAKER
CONWAY D. HILLMAN
BY
ATTORNEY

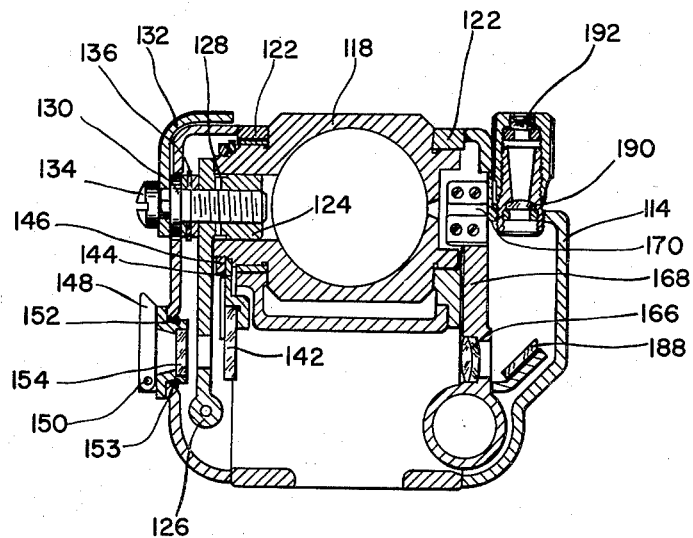
FIG. VI

United States Patent Office 2,971,427
Patented Feb. 14, 1961

2,971,427

SELF-CORRECTING ALIDADE

Carl W. Keuffel, Bernardsville, Allister L. Baker, Denville, and Conway D. Hillman, Millburn, N.J., assignors to Keuffel & Esser Company, Hoboken, N.J., a corporation of New Jersey Filed Jan. 17, 1955, Ser. No. 482,036

7 Claims. (Cl. 88—1)

This invention relates to an optical instrument including means for measuring the angle of elevation of a line of sight with respect to the horizontal direction. More specifically, the invention relates to such an optical instrument provided with an automatic zeroing device so that the elevation angles may be read with respect to the true horizontal direction even though the base of the instrument is not perfectly level.

Pendulum means have been used before in optical instruments intended to establish a horizontal line of sight. For example, Patent No. 1,891,641 of December 20, 1932, to Wenzel Habel shows a construction which is allegedly capable of accomplishing this purpose. However, the instrument disclosed in this patent is not suitable for measuring angular elevations from the true horizontal direction. Patent No. 2,498,273 of February 21, 1950, to Conway D. Hillman discloses an optical instrument for measuring angles of elevation from the horizontal direction which gives accurate readings of the elevation angle even if the base is not perfectly level. However, in order to use the instrument described in this latter patent, it is necessary to first adjust a pivoted member which carries a level vial in order to obtain the correct readings.

The principal objects of the present invention are to provide an instrument which gives accurate readings of elevation angles from the true horizontal direction without the necessity of first leveling the base and without the necessity of making any other adjustments before taking the reading.

Another object of the present invention is to provide an improved means for clamping the axle carrying the telescope in such an instrument.

Another object of the present invention is to provide an improved means for mounting a sealed rotatable reflector to such an instrument for reflecting light into the instrument.

These objects of the invention and the means for their attainment will be more fully understood after reading the following description taken in conjunction with the attached drawings in which:

Fig. I is a view in elevation showing one embodiment of an optical instrument according to the present invention.

Fig. II is a view in partial sectional elevation taken along the line II—II of Fig. I and looking in the direction of the arrows. The telescope and base of the instrument are omitted in this view.

Fig. III is a view in side elevation of the instrument as seen in Fig. II with a cover plate removed.

Fig. IV is a diagrammatic view of the optical system shown along a straight line.

Fig. V is a view showing the scale arrangement as seen through the scale reading eyepiece of the instrument.

Fig. VI is a view similar to Fig. II in partial sectional elevation taken along the line II—II of Fig. I and looking in the direction of the arrows showing a different embodiment of the invention. The telescope and base of the instrument are omitted in this view.

The invention is shown and will be described in the form of a plane table alidade but it should be understood that it is equally applicable to other types of optical instruments such as transits, theodolites, levels and the like. As is well known in the surveying instrument art, an alidade rests on a blade which is provided with a straightedge usually parallel to the line of sight of the telescope. In use, this blade is placed on a drawing board and lines are drawn along the straightedge parallel to the line of sight. Stadia lines are usually provided in the telescope of the alidade for establishing distances to a stadia rod held at various target points spaced from the drawing board. An angular protractor scale usually in the form of an arc is also provided for reading the elevation angle to the various points. In some cases, the protractor scale is calibrated to read directly the horizontal and vertical components of the distance from the instrument to the target points.

Transits and theodolites are provided with a base suitable for mounting them on a tripod. The telescope can be turned about both a vertical and horizontal axis and graduated circles are provided for reading the azimuth and elevation angles. It will be apparent to a person skilled in the art after reading the following description how the present invention could be adopted for use in a transit or theodolite.

A level is also provided with a base for mounting on a tripod which base can be adjusted by leveling screws so that a telescope which can be turned about a vertical axis provides a horizontal line of sight. Although the level is used primarily for determining a horizontal line of sight, there are cases where it might be useful to determine angles of elevation with this type of instrument. It will be apparent to the person skilled in the art how the present invention can be adapted for this purpose in a level.

Referring to Fig. I, the blade 2 of the alidade is adapted to rest on any flat surface such as a drawing board or the like. A trough compass 4 is usually mounted on the blade so that the blade can be oriented in the direction of magnetic north when desired. A circular level vial 6 may also be mounted on the blade to indicate roughly whether the drawing surface of the blade 2 is level. Handles 8 and 10 may be provided at the ends of the blade which are useful for turning the instrument in azimuth over the drawing surface in sighting on a target. The pedestal 12 fastened above the center of the blade 2 carries the main parts of the alidade. The pedestal 12 and the blade 2 will hereinafter be referred to generically as the base of the instrument.

The standards 14 are secured at the top of the pedestal 12. The telescope 16 is mounted on the horizontal axle 18 (Fig. II) for rotation between the standards through a limited angle. The telescope is usually provided with an eyepiece prism 20 at the end of the telescope which projects the line of sight upward at a convenient angle for easier viewing through the telescope when the instrument is mounted on the drawing board.

Referring to Fig. II, the axle 18 fits in bearings 22 carried by the standards 14. A novel form of means for clamping the telescope axle to the standards is provided. This includes a nut 24 fitting inside a coaxial cylindrical hole in the axle 18. The axle 18 is free to turn around the nut 24 but the nut 24 is keyed to the arm 26 but is free to slide in the axial direction with respect to the arm 26. A retaining ring 28 is provided inside the hole in the axle 18 which can be engaged by a shoulder on the nut 24 when the screw 30 is turned to move the nut 24 toward the left along the horizontal axis. This causes a clamping action between the end of the axle 18 and the surface of the arm 26. The screw 30 is turned by means of an arm 32 which is provided with a hexagonally shaped hole fitting over an hexagonal stud on the screw 30. The arm 32 is held against the shoulder on the screw 30 by the holding screw 34 which is threaded into the main screw 30. A resilient washer 36 is mounted between two metal washers on the screw 30 between the shoulder and the arm 26. This resilient washer regulates the clamping pressure. Depending upon the amount to which the arm 32 is turned, the clamp may be used either to lock the telescope rigidly in position or to permit the telescope to be turned by hand when desired but maintaining sufficient clamping action so that the telescope will remain in the position to which it is turned and so that the telescope may then be adjusted with the tangent screw. Because of the keying between the nut 24 and the arm 26 the pivoting of the telescope 16 about its axle 18 does not affect the degree of clamping pressure. A tangent screw 38 (see Fig. I) acts against the lower end of the arm 26 for fine adjustment of the angular position of the telescope 16 when the arm 26 is clamped to the telescope axle 18. The tangent screw is of conventional construction and the usual plunger and coil spring are provided to act against the opposite side of the lower end of the arm 26 to hold it against the end of the tangent screw 38. The coil spring is held in place by the mount 40, Fig. I, which is threaded into the standards 14.

The arc 42 is preferably made of glass and is carried in the mount 44 which is secured to the axle 18 by a lock ring 46. The arc 42 may be cemented to the mount 44 or held by any other suitable means. The arc is provided with angular graduations and suitable numbering which is illuminated by means of the adjustable reflector 48. The reflector 48 is pivoted at 50 to an annular journal 52. The annular journal 52 is mounted in the opening in the wall of the standards 14 and pivots therein. Thus the mirror 48 can be pivoted about two different axes in order to get the best possible illumination by reflecting the maximum amount of light from the sky through the window 54 along the optical line of sight of the scale reading system. The window 54 is mounted in an opening in the annular journal 52 sealing the inside of the instrument against dust, etc. The annular journal 52 is held in place by an O ring 53 of resilient material held in an annular notch between the annular journal and the wall of the standards 14. This O ring permits the annular journal to turn in the opening but seals the inside of the instrument against dust and the like. Because it is resilient, it also serves to hold the journal 52 in an adjusted position.

The annular graduations provided on the arc or the arcuate protractor scale 42 are made up of divisions or graduations radiating from the axis of the horizontal axle 18. These graduations lie on a surface of the arcuate protractor scale 42 in a vertical plane perpendicular to the axis of the horizontal axle 18. The arcuate protractor scale 42 turns with the telescope 16 on the axle 18. The optical system for reading the protractor scale 42 includes a fixed lens combination. In the embodiment shown, the fixed lens combination is made up of the two single lenses 56 and 58 which are carried in mounts 60 and 62 which in turn are carried in a tube 64 and held in place therein by set screws as shown. The tube 64 fits into a cylindrical opening provided in a boss which forms part of the casting for the standards 14. The optical axis of the fixed lens combination 56 and 58 is parallel to the axis of the horizontal axle 18 and passes through the graduations provided on the arcuate protractor scale 42. The optical scale reading system also includes a movable lens combination which in the embodiment shown is in the form of a cemented doublet lens 66. The movable lens combination 66 is carried on a pendulum member 68 which in the embodiment shown is pivoted at the axis of the horizontal axle 18 by means of a very thin flexible strip 70. The flexible strip 70 must be extremely flexible so that it offers practically no resistance to the swinging of the pendulum member 68 when it finds its true equilibrium position under the action of gravity. As shown in Fig. III, the flexible strip 70 is clamped against the projection 72 provided inside of the standards 14 by the block 74. The lower end of the flexible strip 70 is clamped against a projection 76 at the upper end of the pendulum member 68 by a block 78. Adjustable stop screws 80 and 82 are provided to limit the motion of the upper end of the pendulum member 68. These are desirable in order to protect the flexible strip 70 against damage when the instrument is transported from place to place. It should be understood that the flexible strip is only one suitable pivoting means for the pendulum member 68. For example, a knife edge pivot could also be used.

The lower end of the pendulum member 68 is provided with a damping means. In the embodiment shown, this is an air damping means consisting of two cylindrical holes extending inward from the front and back sides of the pendulum member. Each of these holes have one closed end at the central part of the pendulum member. The fixed pistons 84 and 86 carried by the standards 14 extend into these holes. The clearance between the pistons 84 and 86 and the walls of these cylindrical holes is very small so that the air moves in and out of these holes past the pistons very slowly which effectively damps the motion of the pendulum member 68. The pistons 84 and 86 are adjustable so that the small clearance can be obtained without danger of the pistons interfering with the freedom of the pendulum member 68 to find its true equilibrium position under the action of gravity. However, the free motion of the pendulum member 68 is limited by the pistons to a certain predetermined angle. This angle depends upon the sensitivity of the circular level vial 6 and is chosen so that the pendulum will always be free as long as the bubble of the circular level vial lies within the circular mark provided on the level vial. The fact that the pistons 84 and 86 serve to limit the motion of the lower end of the pendulum member 68 in both the horizontal and vertical direction acts as a further protection for the flexible strip 70. The line of sight of the optical scale reading system is bent upward through an angle of 90° by the reflector 88 to a reticle 90 which is provided with an index mark or a breakdown scale made up of graduations one of which may be considered an index mark. The reflector 88 is cemented to a mount 89 which is held to the wall of the standards 14 by screws as shown. A resilient member 91 is provided between the mount 89 and the wall to permit adjustment of the reflector 88 by means of the screws. The image of the graduations on the arcuate protractor scale 42 formed by the lenses 56, 58 and 66 is superimposed on the index mark or breakdown scale provided on the reticle 90. The superimposed lines are viewed through the eyepiece 92. When the instrument is in proper adjustment, the reading of the marks against the arcuate protractor scale indicates the angular elevation of the line of sight of the telescope 16 just as long as the base of the instrument is sufficiently level to bring the bubble of the circular level vial within the circle provided thereon.

Fig. IV is a diagrammatic view of the scale reading optical system which is shown in straight line form; i.e., the line of sight is not bent by the reflector 88. In this diagrammatic view, the fixed lens combination is shown as a single lens 57 and the movable lens combination 66 is shown as a single lens in order to simplify the discussion which follows:

It is obvious that if the scale reading optical system reads correctly when the telescope line of sight is horizontal, it will also read correctly for other elevation angles. For the sake of this discussion, we will call the zero line the graduation line of the arcuate protractor scale 42 which should be superimposed upon the index mark provided on the reticle 90 when the telescope line of sight is horizontal. In Fig. IV, the dimension $(a)$ is the distance along the optical path from the plane of the graduation lines making up the arcuate protractor scale to the first nodal point of the fixed lens combination 57. The dimension (b) is the distance along the optical path from the second nodal point of the fixed lens combination 57 to the first nodal point of the movable lens combination 66. The dimension (c) is the distance along the optical path from the second nodal point of the movable lens combination 66 to the plane of the index mark provided on the reticle 90. $f_1$ is the equivalent focal length of the fixed lens combination. $f_2$ is the equivalent focal length of the movable lens combination.

The view of Fig. IV is a plan view; i.e., a view looking down from above the instrument on the scale reading optical system. The relationships between the dimensions of the optical scale reading system necessary in order to obtain the desired results will now be described with reference to Fig. IV. For the sake of illustration, Fig. IV is drawn with the assumption that the base of the instrument is inclined downward at the objective end of the telescope. In order to obtain a level line of sight, the telescope is therefore turned upward at the objective end with respect to the standards 14. Since the arcuate scale 42 moves with the telescope, the zero graduation moves towards the top of Fig. IV with respect to the optical path of the fixed lens combination 57. At the same time, the movable lens combination 66 will swing by gravity to a position above the optical path of fixed lens combination 57 as shown in Fig. IV. If the distance of the zero line (for a horizontal line of sight) from the optical path of the fixed lens combination 57 is $x$, the radius from the horizontal axis of the axle 18 to the graduations on the arcuate protractor scale 42 is $r_1$ and the radius from the pivot means 70 of the axis of the movable lens combination 66 is $r_2$, the distance of the movable lens combination 66 above the optical path of the fixed lens combination 57 will be $$\frac{r_2}{r_1}x$$

The index mark provided on the reticle 90 will lie on the optical axis of the fixed lens combination 57. By means of the usual formulae relating to the focal lengths, object and image distances of the lenses 57 and 66 and by means of the usual magnification formulae it can be shown that the equations:

$$f_1 = \frac{ar_2(b+c)}{r_2(a+b+c) - r_1c}$$

$$f_2 = \frac{c(ar_2 + br_1)}{r_1(b+c)}$$

should be satisfied in order that the reading of the protractor scale indicates the true elevation angle of the line of sight of the telescope with respect to gravity even though the support is not perfectly level.

If the pivot means 70 lies on the axis of the horizontal axle 18 as in the embodiment shown; i.e. $r_1 = r_2$, the above formulae are reduced to the following:

$$f_1 = \frac{a(b+c)}{a+b}$$

$$f_2 = \frac{c(a+b)}{b+c}$$

An alternative embodiment of the invention is illustrated in Fig. 6. In this case where the index mark carried on the reticle 190 also lies on the axis of the horizontal axle 118, it is possible to eliminate the fixed lens combination entirely and image the protractor scale graduations directly on the reticle by means of the movable lens combination 166 and the mirror 188 provided the distance from the mirror 188 to the reticle 190 equals $r_1$ and $r_2$ and provided the mirror 188 is pivoted on the pendulum member. In Fig. VI the other parts are also numbered so that corresponding parts shown in Fig. II have a number equal to the number in Fig. II plus 100. The description of these other parts is as has been given above in connection with Fig. II.

The appearance of the scales as seen through the eyepiece 92 for one embodiment of the invention is shown in Fig. V. The scale furthermost to the right in this figure carrying numbers 102 through 105 is the angular elevation scale in degrees. In this particular embodiment, the numbering starts from the center position; i.e., the instrument would read zero when the telescope was pointing vertically upward and would read 90° when the telescope is pointing horizontally. With this system of numbering, the 90° graduation would become the zero mark referred to in the preceding discussion. The line marked with the small zero is in the index mark for reading the angular elevation scale. A breakdown scale is also provided which extends from this index mark. This breakdown scale divides the angular scale into twelve parts of a degree or 5 minutes. When using the breakdown scale, the reading is taken by noting the position on the breakdown scale which is intersected by one of the angular degree graduations. In the case illustrated in Fig. V, the reading is 103° 30'.

The other two scales shown in Fig. V represent the horizontal and vertical components of a distance measured along the line of sight of the telescope. In the usual case where the stadia ratio is 100 to 1 the reading of these graduations multiplied by the stadia intercept gives the horizontal and vertical components of the distance.

Having thus described the invention, what is claimed is:

1. An optical instrument comprising a support provided with horizontal bearing means, a horizontal axle pivoted in said bearing means, a telescope carried on said horizontal axle having its line of sight perpendicular to the axis of said horizontal axle, an arcuate protractor scale mounted on said horizontal axle pivoted with said telescope and centered on the axis of said horizontal axle and an optical system for reading said protractor scale including a fixed lens combination (made up of at least one lens element) mounted in said support, a movable lens combination (made up of at least one lens element) mounted on a pendulum member pivoted to swing in a plane perpendicular to said horizontal axle and free to find an equilibrium position determined by the direction of gravity, said optical system imaging a portion of said protractor scale against an index mark, said lens combination which is mounted nearest to said protractor scale having an axis parallel to said horizontal axle so that the reading of said protractor scale indicates the true elevation angle of the line of sight of said telescope with respect to gravity even if said support is not perfectly level.

2. An optical instrument comprising a support provided with horizontal bearing means, a horizontal axle pivoted in said bearing means, a telescope carried on said horizontal axle having its line of sight perpendicular to the axis of said horizontal axle, an arcuate protractor scale having divisions radiating from the axis of said horizontal axle in a vertical plane perpendicular to the axis of said horizontal axle mounted on said horizontal axle pivoted with said telescope, the radius from the axis of said horizontal axle to said graduations being $r_1$, and an optical system for reading said protractor scale including a fixed lens combination (made up of at least one lens element) having an equivalent focal length $f_1$ mounted in said support with its optical axis parallel to the axis of said horizontal axle, the distance from said protractor scale to the first nodal point of said fixed lens combination along the optical path being $a$, a movable lens combination (made up of at least one lens element) having an equivalent focal length $f_2$ mounted on a pendulum member pivoted in a plane perpendicular to said horizontal axle and free to find an equilibrium position determined by the direction of gravity, the vertical distance from the point of support of said pendulum member to the optical axis of said fixed lens combination being $r_2$, said movable lens combination being spaced further from said protractor scale than said fixed lens combination and the distance from the second nodal point of said fixed lens combination to the first nodal point of said movable lens combination along the optical path being $b$, a reticle having an index mark mounted along the optical path from said movable lens combination spaced a distance $c$ along the optical path from the second nodal point of said movable lens combination, said optical system being aligned so that the zero graduation of said protractor scale is imaged on said index mark when the line of sight of said telescope is horizontal, the following formulae:

$$f_1 = \frac{ar_2(b+c)}{r_2(a+b+c) - r_1 c}$$

and $$f_2 = \frac{c(ar_2 + br_1)}{r_1(b+c)}$$

being satisfied so that the reading of said protractor scale indicates the true elevation angle of the line of sight of said telescope with respect to gravity even if said support is not perfectly level.

3. An optical instrument comprising a support provided with horizontal bearing means, a horizontal axle pivoted in said bearing means, a telescope carried on said horizontal axle having its line of sight perpendicular to the axis of said horizontal axle, an arcuate protractor scale having divisions radiating from the axis of said horizontal axle mounted on said horizontal axle and pivoted with said telescope and an optical system for reading said protractor scale including a fixed lens combination (made up of at least one lens element) having an equivalent focal length $f_1$ mounted in said support with its optical axis parallel to the axis of said horizontal axle passing through the graduations making up said protractor scale, the distance from said protractor scale to the first nodal point of said fixed lens combination along the optical path being $a$, a movable lens combination (made up of at least one lens element) having an equivalent focal length $f_2$ mounted on a pendulum member pivoted on the axis of said horizontal axle in a plane perpendicular thereto and free to find an equilibrium position determined by the direction of gravity, the vertical distance from the point of support of said pendulum member to the optical axis of said fixed lens combination being equal to the distance from said horizontal axle to said protractor scale graduations, said movable lens combination being spaced further from said protractor scale than said fixed lens combination and the distance from the second nodal point of said movable lens combination along the optical path being $b$, a reticle having an index mark mounted along the optical path from said movable lens combination spaced a distance $c$ along the optical path from the second nodal point of said movable lens combination, said optical system being aligned so that the zero graduation of said protractor scale is imaged on said index mark when the line of sight of said telescope is horizontal, the following formulae:

$$f_1 = \frac{a(b+c)}{a+b}$$

and $$f_2 = \frac{c(a+b)}{b+c}$$

being satisfied so that the reading of said protractor scale indicates the true elevation angle of the line of sight of said telescope with respect to gravity even if said support is not perfectly level.

4. An optical alidade comprising a support including a blade for resting said support on a drawing surface and provided with horizontal bearing means providing a horizontal axis in a plane perpendicular to the edges of said blade, a horizontal axle pivoted in said bearing means, a telescope carried on said horizontal axle having its line of sight perpendicular to the axis of said horizontal axle, an arcuate protractor scale having divisions radiating from the axle of said horizontal axle in a vertical plane perpendicular to the axis of said horizontal axle and pivoted with said telescope and an optical system for reading said protractor scale including a fixed lens combination (made up of at least one lens element) having an equivalent focal length of $f_1$ mounted in said support with its optical axis parallel to the axis of said horizontal axle passing through the graduations making up said protractor scale, the distance from said protractor scale to the first nodal point of said fixed lens combination along the optical path being $a$, a movable lens combination (made up of at least one lens element) having an equivalent focal length $f_2$ mounted on a pendulum member pivoted on the axis of said horizontal axle in a plane perpendicular thereto and free to find an equilibrium position determined by the direction of gravity, the vertical distance from the point of support of said pendulum member to the optical axis of said fixed lens combination being equal to the distance from the axis of said horizontal axle to said protractor scale graduations, said movable lens combination being spaced further from said protractor scale than said fixed lens combination and the distance from the second nodal point of said fixed lens combination to the first nodal point of said movable lens combination along the optical path being $b$, a reticle having an index mark mounted along the optical path from said movable lens combination spaced a distance $c$ along the optical path from the second nodal point of said movable lens combination, said optical system being aligned so that the zero graduation of said protractor scale is imaged on said index mark when the line of sight of said telescope is horizontal, the following formulae:

$$f_1 = \frac{a(b+c)}{a+b}$$

and $$f_2 = \frac{c(a+b)}{b+c}$$

being satisfied so that the reading of said protractor scale indicates the true elevation angle of the line of sight of said telescope with respect to gravity even if said support is not perfectly level, reflecting means in the optical path between said movable lens combination and said reticle directing the line of sight upward for easier reading and an eyepiece for viewing said reticle.

5. An optical instrument comprising a support provided with horizontal bearing means, a horizontal axle pivoted in said bearing means, a telescope carried on said horizontal axle having its line of sight perpendicular to the axis of said horizontal axle, an arcuate protractor scale mounted on said horizontal axle pivoted with said telescope and centered on the axis of said horizontal axle and an optical system for reading said protractor scale including at least one lens element mounted on a pendulum member pivoted with respect to said support on the axis of said horizontal axle in a plane perpendicular to said horizontal axle and free to find an equilibrium position determined by the direction of gravity, said lens element having an axis parallel to said horizontal axle, a reticle having an index mark on the axis of said horizontal axle, reflecting means carried on said pendulum member directing light from said lens to said reticle said optical system imaging a portion of said protractor scale against an index mark so that the reading of said protractor scale indicates the true elevation angle of the line of sight of said telescope with respect to gravity even if said support is not perfectly level.

6. An optical instrument comprising a support provided with horizontal bearing means, a horizontal axle pivoted in said bearing means, an arcuate protractor scale mounted on said horizontal axle pivoted therewith and centered on the axis of said horizontal axle and an optical system for reading said protractor scale including a fixed lens combination (made up of at least one lens element) mounted in said support, a movable lens combination (made up of at least one lens element) mounted on a pendulum member pivoted to swing in a plane perpendicular to said horizontal axle and free to find an equilibrium position determined by the direction of gravity, said optical system imaging a portion of said protractor scale against an index mark, said lens combination which is mounted nearest to said protractor scale having an axis parallel to said horizontal axle, so that the reading of said protractor scale indicates the angular relation of said horizontal axle with respect to gravity even if said support is not perfectly level.

7. An optical instrument comprising a support provided with horizontal bearing means, a horizontal axle pivoted in said bearing means, a telescope carried on said horizontal axle having its line of sight perpendicular to the axis of said horizontal axle, an arcuate protractor scale mounted on said horizontal axle pivoted with said telescope and centered on the axis of said horizontal axle and an optical system for reading said protractor scale including at least one lens element mounted on a pendulum member pivoted with respect to said support on the axis of said horizontal axle in a plane perpendicular to said horizontal axle and free to find an equilibrium position determined by the direction of gravity, at least the portion of said optical system which is nearest to said protractor scale having an axis parallel to said horizontal axle, a reticle having an index mark on the axis of said optical system, said optical system imaging a portion of said protractor scale against an index mark so that the reading of said protractor scale indicates the true elevation angle of the line of sight of said telescope with respect to gravity even if said support is not perfectly level.

References Cited in the file of this patent

UNITED STATES PATENTS

| | | |
|---|---|---|
| 239,315 | Chandler | Mar. 29, 1881 |
| 1,332,145 | Pyle | Feb. 24, 1920 |
| 1,694,833 | Shively | Dec. 11, 1928 |
| 1,717,044 | Kosken | June 11, 1929 |
| 1,969,697 | Kiefer | Aug. 7, 1934 |
| 2,037,030 | Kollmorgen | Apr. 14, 1936 |
| 2,487,875 | Hutchison | Nov. 15, 1949 |
| 2,498,273 | Hillman | Feb. 21, 1950 |
| 2,552,893 | Hillman et al. | May 15, 1951 |
| 2,620,564 | Rothweiler | Dec. 9, 1952 |
| 2,679,181 | Keuffel et al. | May 25, 1954 |